United States Patent
Smith et al.

(10) Patent No.: US 6,670,791 B1
(45) Date of Patent: Dec. 30, 2003

(54) DUAL PATH BREAK BEFORE MAKE DIGITAL CIRCUIT

(75) Inventors: Gregory J. Smith, Tucson, AZ (US); Yinming Chen, Tucson, AZ (US); Igor Furlan, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 126 days.

(21) Appl. No.: 10/071,876

(22) Filed: Feb. 8, 2002

(51) Int. Cl.[7] .............................................. H01M 10/46
(52) U.S. Cl. ....................................................... 320/134
(58) Field of Search ................................. 320/134, 136; 361/13, 56, 103, 111, 115, 118

(56) References Cited

U.S. PATENT DOCUMENTS

| | | | |
|---|---|---|---|
| 3,660,723 A | * | 5/1972 | Lutz et al. |
| 4,802,710 A | * | 2/1989 | Burgdorf et al. |
| 5,471,128 A | | 11/1995 | Patino et al. |
| 5,504,411 A | | 4/1996 | McCaleb et al. |
| 5,546,264 A | | 8/1996 | Williamson et al. |
| 5,767,659 A | | 6/1998 | Farley |
| 5,867,007 A | * | 2/1999 | Kim |
| 5,982,149 A | | 11/1999 | Shih |
| 6,154,081 A | | 11/2000 | Pakkala et al. |

OTHER PUBLICATIONS

"Lithium–Ion Linear Battery Charger Controller", *Data Sheet LTC1732–4/LTC1732–4.2*, Linear Technology Corporation pp. 1–12, no date.

\* cited by examiner

*Primary Examiner*—Edward H. Tso
(74) *Attorney, Agent, or Firm*—Merchant & Gould P.C.; Timothy P. Sullivan

(57) ABSTRACT

The present invention provides a redundant break before make digital circuit. Redundant circuits are used to provide a path to ground for a charging signal when a fault condition exists. The fault condition may be based on characteristics relating to the signal or the chip itself. For example, a fault condition may occur when a temperature measured on the chip exceeds a predetermined threshold. A fault condition may also occur when the signal is above or below a predetermined threshold. For example, a fault condition may occur when the current of the signal is above a predetermined level. The fault conditions are monitored and the state of a switch that couples the cell to the charging path is monitored. When the switch is open and a fault condition has occurred, there are redundant paths to ensure that a switch closes to provide the path to ground during the fault condition.

20 Claims, 4 Drawing Sheets

DUAL PATH BREAK BEFORE MAKE DIGITAL CIRCUIT

FIELD OF THE INVENTION

The present invention is related to electronic circuits, and more particularly to a redundant break before make digital electronic circuit.

BACKGROUND OF THE INVENTION

Many portable electronic devices utilize a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller, lighter, and a have a higher charge capacity than other popular rechargeable battery types.

Typically, to charge a battery, a battery is connected to a charger that is plugged into an AC outlet. During the time the charger is plugged in and the device is in the charger, an indicator light on the charger generally shows the charging status of the battery. For example, the indicator light may flash when the battery is charging and be on constantly when the battery is fully charged. If the user removes the charger plug from the wall with the device still in the charger, the stored charge of the battery may be reduced.

The charging of lithium ion batteries is conducted in a different manner than the charging of nickel type rechargeable batteries. Generally, nickel type rechargeable batteries are charged by applying a constant current until the cell reaches a predetermined voltage or temperature. A lithium ion cell, however, uses a different charging process. First, the lithium ion cell is supplied with a current until the cell's voltage rises above a threshold. Next, the battery charger is held at the threshold until the current of the cell decreases to a predetermined level.

Therefore, if a battery is charged using a charger not designed specifically for the battery ("non-compliant charger") damage to the battery may occur. For example, if a lithium ion battery is placed within a charger designed for a nickel rechargeable battery, the result may be damaging to the battery. The voltage of the lithium ion battery may rise to a dangerous level or overheat. If the battery is overcharged a potential for an explosion of the battery exists.

SUMMARY OF THE INVENTION

The present invention is directed at providing a redundant break before make digital circuit. According to one aspect of the invention, redundant circuits are used to create a path to ground for a signal when a fault condition exists.

According to another aspect of the invention, the fault conditions are monitored. The fault condition may be based on characteristics relating to the signal or the chip itself. For example, a fault condition may occur when a temperature measured on the chip exceeds a predetermined threshold. A fault condition may also occur when the signal is above or below a predetermined threshold. For example, a fault condition may occur when the current of the signal is above a predetermined level.

According to yet another aspect of the invention, the state of a switch that couples a cell to a charging path is monitored. When the switch is open and a fault condition has occurred, there are redundant paths to ensure that a switch closes to provide the path to ground during the fault condition.

DETAILED DESCRIPTION OF THE PREFERRED EMBODIMENT

Figure 1:
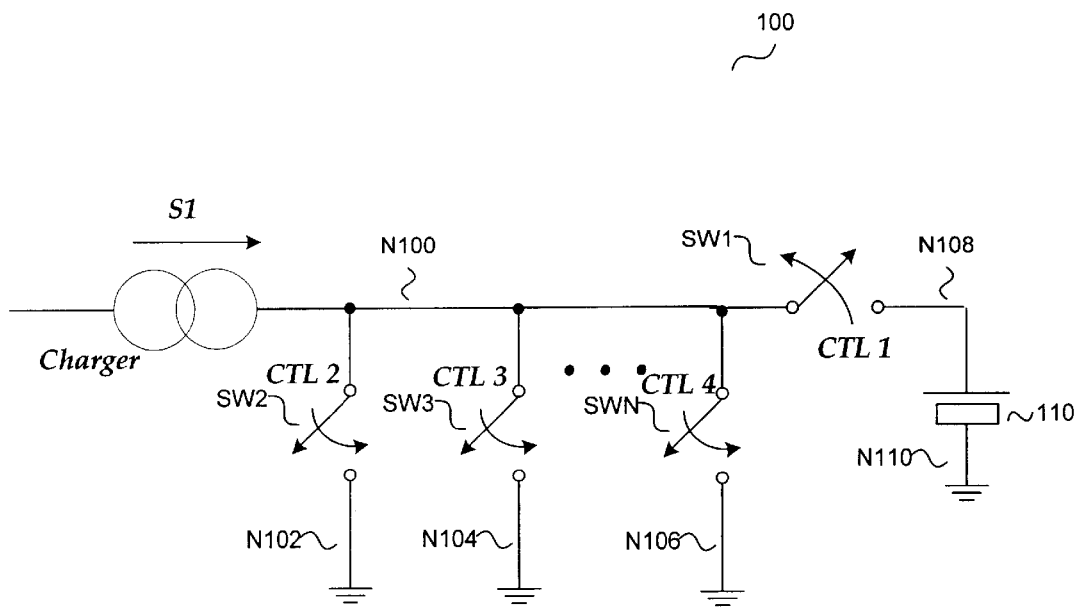
FIG. 1 illustrates an overview diagram of an n-path break before make circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "fault condition" means a condition relating to an improper charging condition relating to the cell. The term "cell" includes single rechargeable cells and multiple rechargeable cells. Referring to the drawings, like numbers indicate like parts throughout the views.

FIG. 1 illustrates an overview diagram of an n-path break before make circuit, in accordance with aspects of the invention. As shown in the figure, n-path break before make circuit 100 includes, a charger, switch SW1, switches SW2–SWN, and cell 110.

N-path break before make circuit 100 is connected as follows. Switch SW1 is coupled between node N100 and node N108. Cell 110 is coupled between node N108 and node N110. Switches SW2–SWN, are coupled between node N100 and nodes N102, N104, and N106, respectively. Node N100 is coupled to the charger. Nodes N102, N104, N106, and N110 are coupled to ground.

The operation of n-path break before make circuit 100 will now be described. When a fault condition relating to the charging of cell 110 is detected, the charging signal is diverted to ground and away from cell 110. During a fault condition, switch SW1 is configured to turn off ("break"), and switches SW2–SWN are configured to turn on ("make"). A fault condition may occur when an non-compliant charger is coupled to the cell. For example, the non-compliant charger may be a charger that provides a charging signal that is not within a predetermined threshold. An non-compliant charger may be detected when the current of a charging signal exceeds a predetermined current. More specifically, when signal S1 at node N100 exceeds a predetermined threshold, the path to cell 110 is broken by breaking the connection to cell 110 by switching off switch SW1 and providing a path to ground for signal S1 by activating at least one of switches SW2–SWN. Switch SW1 is turned off first such that switches SW2–SWN do not pull current from cell 110 thereby causing the supply to drop. If switches SW2–SWN are allowed to turn on before switch SW1 turning off, the supply may drop to a level that causes the chip to not work. Each switch (SW2–SWN) provides a redundant path to ground for signal S1 when a fault condition is detected. When one of the switches (SW2–SWN) fails, other switches are configured to provide the path to ground for the signal. For example, if switch SW2 fails to operate, switches SW3–SWN are still able to provide the path to ground for the signal. The switch control signal for switch SW1 (CTL 1) is a different control signal from the control signals that operate switches SW2–SWN. This helps to ensure that the path to ground will become active even if switch 1 fails to open. During the fault condition, the signal S1 is diverted from cell 110 and goes to ground.

Figure 2:
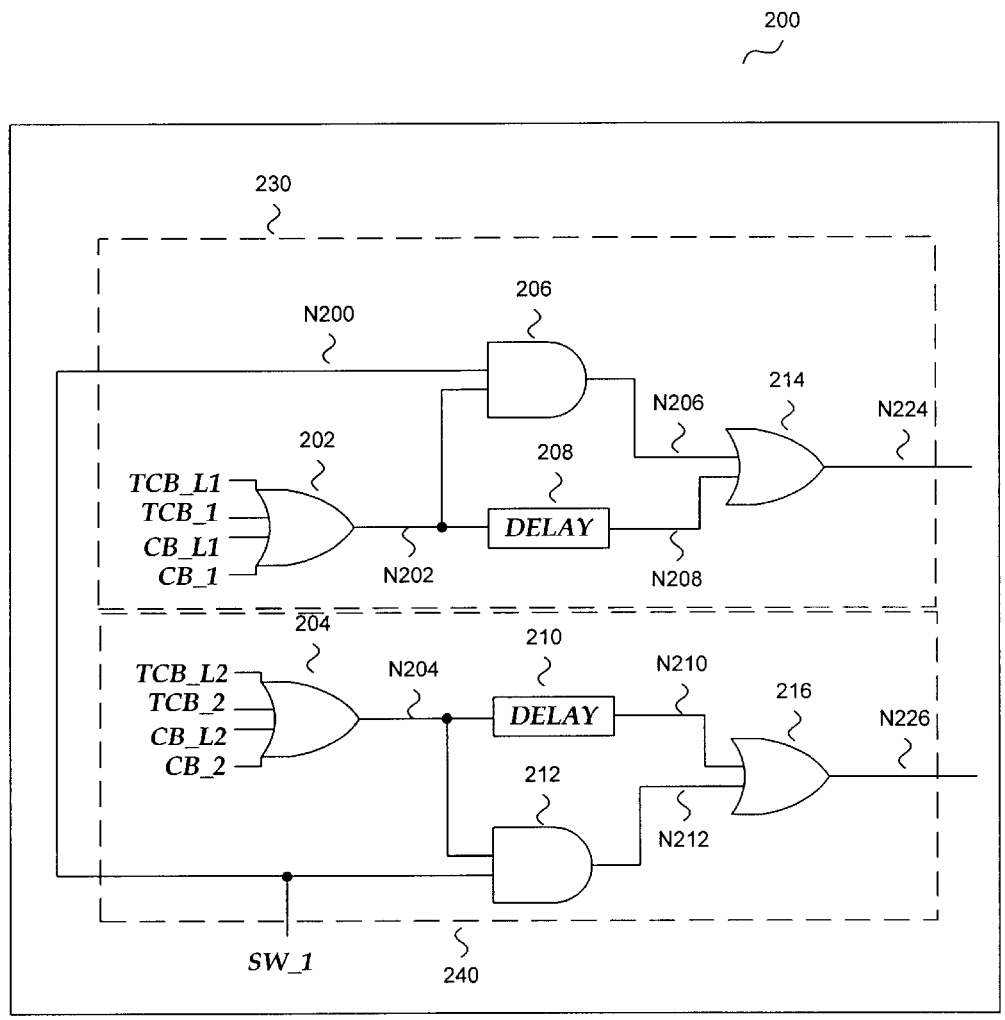
FIG. 2 shows a break before make digital circuit.

FIG. 2 shows a break before make digital circuit, in accordance with aspects of the invention. As shown in the figure, break before make digital circuit 200 includes OR gate 202, OR gate 204, AND gate 206, AND gate 212, OR gate 214, OR gate 216, delay circuit 208, and delay circuit 210.

Break before make digital circuit 200 is connected as follows. AND gate 202 has an input coupled to signal TCB_L1, an input coupled to TCB_1, and input coupled to CB_L1, an input coupled to CB_1, and an output coupled to node N202. AND gate 206 has an input coupled to node N202, an input coupled to node N200, and an output coupled to node N206. OR gate 214 has an input coupled to node N206, an input coupled to node N208, and an output coupled to node N224. Delay circuit 208 is coupled between node N202 and node N208.

AND gate 204 has an input coupled to signal TCB_L2, an input coupled to TCB_2, and input coupled to CB_L2, an input coupled to CB_2, and an output coupled to node N204. AND gate 212 has an input coupled to node N204, an input coupled to node N200, and an output coupled to node N212. OR gate 216 has an input coupled to node N210, an input coupled to node N212, and an output coupled to node N226. Node N200 is coupled to signal SW_1. Delay circuit 210 is coupled between node N204 and node N210.

Node N224 is coupled to the logic to activate and deactivate switch SW2. Node N226 is coupled to the logic to activate and deactivate switch SW3 (See FIG. 1).

The operation of break before make circuit 200 will now be described. The circuit is designed such that it directed at operating even when a single failure within the circuit exists. The discussion of break before make circuit 230 also describes the operation of break before make circuit 240, and, therefore, break before make circuit 240 will not be described separately. Any of the inputs (TCB_L1, TCB_1, CB_L1, CB_1) to OR gate 202 will cause the output of OR gate 202 to be a logical high ("1"). When one of the inputs is high, a fault condition exists. TCB_1 is a thermal crowbar signal that is responsive to the temperature on the circuit. According to one embodiment of the invention, TCB_1 goes high when the temperature of the IC charging circuit goes above 125 degrees Fahrenheit. Other temperatures thresholds may be set. TCB_1 is also used in setting a thermal crowbar latch (not shown). TCB_L1 is a thermal crowbar latch signal that is configured to be a logical high ("1") when a thermal crowbar event occurs. By providing both the thermal crowbar latch signal (TCB_L1) and the thermal crowbar signal (TCB_1) redundant signals are provided to OR gate 202 helping to ensure that on a crowbar event, the break of switch SW1 occurs. Redundant sensor output signals TCB_L2 and TCB_2 correspond to signal TCB_L1 and TCB_1. CB_1 is configured to be a logical high when a predetermined current flowing into the charging path for the cell is exceeded. According to one embodiment of the invention, when the current exceeds the predetermined threshold for 2 microseconds the CB_1 signal goes high. CB_L1 is a crowbar latch signal that is configured to be a logical high when CB_1 goes high. Redundant sensor output signals CB_L2 and CB_2 correspond to signal CB_L1 and CB_1. By providing both the crowbar latch signal (CB_L1) and the crowbar signal (CB_1) redundant signals are provided to OR gate 202 helping to ensure that on a crowbar event, the break of switch SW1 occurs.

AND gate 206 has an input that receives signal SW_1 and the output of OR gate 202. AND gate 206 provides an alternate path around delay circuit 208 to activate ("make") switch SW2 during the times there is a crowbar condition (TCB_L1, TCB_1, CB_L1, or CB_1 is high) and signal SW_1 is a logical high. Signal SW_1 is a logical high when switch SW1 is in an off or "break" position.

Delay circuit 208 is configured to delay the output of OR gate 202 for a predetermined period of time. Delay circuit 208 is configured to delay the output of OR gate 202 for a period of time sufficient for switch SW1 to turn off, or "break" the charging path to cell 110 (See FIG. 1). According to one embodiment, delay circuit 208 is a clock circuit. As can be seen by referring to break before make circuit 230, AND gate 206 provides an alternate path that may be used to activate, or "make", switch SW2 when the delay circuit 208 fails.

OR gate 214 is configured to output a logical high value when either the path through delay circuit 208 is high, or when the output of AND gate 206 is high. When the output of OR gate 214 is high, switch SW2 is closed thereby providing a charging path to ground.

Break before make circuit 240 provides a redundant break before make circuit in cases where break before make circuit 230 fails to operate. As mentioned above, redundant sensor inputs TCB_L2, TCB_2, CB_L2, and CB_2, along with redundant circuitry provide an independent circuit that will operate even when the other circuits fail. A single circuit may have a defective part, such as OR gate 202, that if redundancy were not provided could have catastrophic consequences. Additional break before make circuits may be added.

Figure 3:
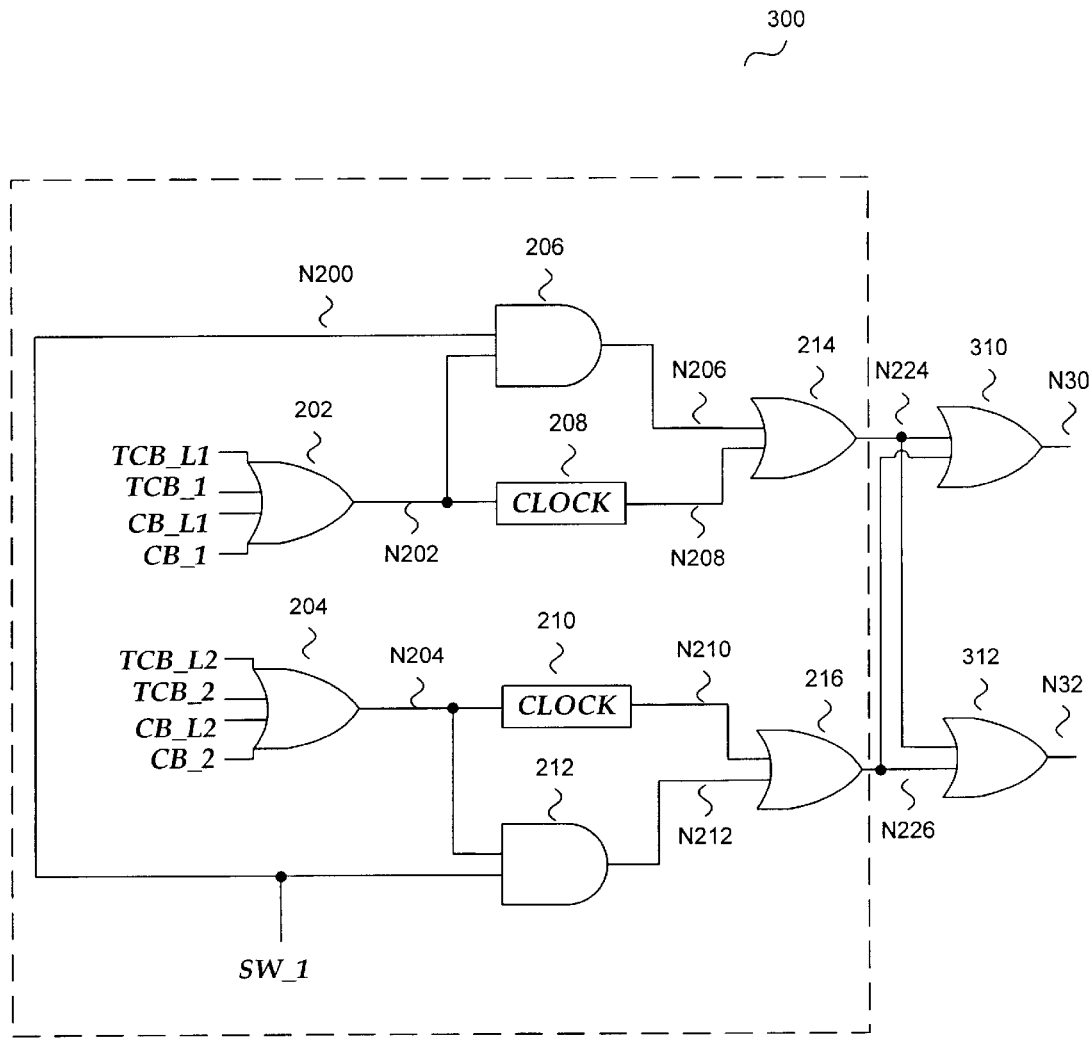
FIG. 3 shows a break before make digital circuit with added redundancy.

FIG. 3 shows a break before make digital circuit with added redundancy, in accordance with aspects of the invention. The circuit shown in FIG. 3 is substantially similar to the circuit shown in FIG. 2. The additional components shown in FIG. 3 include OR gate 310 and OR gate 312.

The connection of the additional components illustrated in FIG. 3 will now be described. OR gate 310 has an input coupled to node N224 and input coupled to node N226, and an output coupled to node N30. OR gate 312 has an input coupled to node N224, an input coupled to node N226, and an output coupled to node N32. Node N30 is coupled to switch SW2. Node N32 is coupled to switch SW3.

The operation of circuit 300 is substantially similar to the operation of break before make circuit 200. Therefore, only the differences between break before make circuit 200 and break before make circuit 300 will be described. Cross coupling the outputs of OR gate 214 and OR gate 216 provides an extra level of redundancy to activate the redundant switches within the circuit when a fault condition exists.

Figure 4:
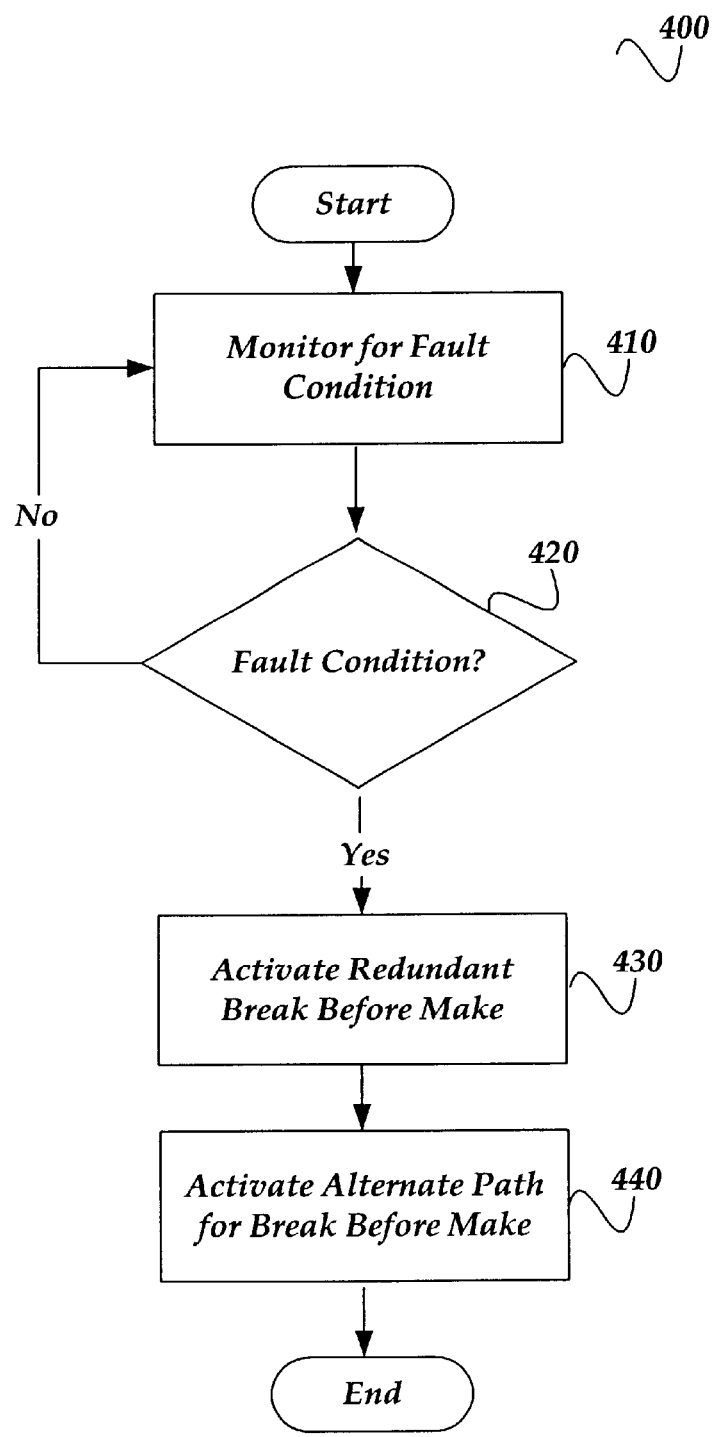
FIG. 4 illustrates a flow chart for a process for activating a break before make circuit, according to aspects of the invention.

FIG. 4 illustrates a flow chart for a process for activating a break before make circuit, according to one embodiment of the invention. After a start block, the process moves to block 410 at which point the process monitors for a fault condition. According to one embodiment of the invention, a fault condition may occur when the temperature of the circuit exceeds a predetermined threshold, or when the level of the charging signal exceeds a predetermined threshold. More specifically, a thermal crowbar event fault condition occurs when the chip temperature exceeds a predetermined temperature, such as 125 degrees Fahrenheit. A current crowbar event fault condition occurs when the current of the charging signal exceeds a predetermined current level. The predetermined current level is based on the charging characteristics relating to the cell. The process steps to decision block 420 at which point the logic determines when a fault condition occurs. When a fault condition does not occur, the process returns to monitor for fault conditions at block 410. When a fault condition occurs, the process moves to block 430, at which point the digital break before make circuit is activated. When the digital break before make circuit is activated, the charging path will be to ground, rather than to the cell. Moving to block 440, the process activates an alternate break before make path in order to help ensure that the charging path to ground is provided. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for making a path to ground after a break occurs when a fault condition is detected, comprising:
    a signal coupled to a first node;
    a first switch that is coupled to the first node, wherein the first switch is configured to decouple the signal from a cell when a fault condition occurs;
    a second switch that is coupled to the first node and is configured to couple the signal to ground when a fault condition occurs that is detected by a first break before make circuit; and
    a third switch circuit that is coupled to the first node and is configured to couple the signal to ground when a fault condition occurs that is detected by a second break before make circuit.

2. The apparatus of claim 1, wherein the fault condition occurs when the signal at the first node exceeds a predetermined threshold.

3. The apparatus of claim 2, wherein the fault condition occurs when a temperature relating to the cell exceeds a predetermined temperature.

4. The apparatus of claim 3, wherein the predetermined temperature is 125 degrees Fahrenheit.

5. The apparatus of claim 4, wherein the second switch and the third switch couple the signal to ground when the fault condition occurs after the first switch decouples the signal from the cell.

6. The apparatus of claim 5, wherein the first break before make circuit further comprises:
    a first OR gate having a first input coupled to a thermal crowbar signal, a second input coupled to a crowbar signal; and an output coupled to a second node;
    a first delay circuit having an input coupled to the second node and an output arranged to delay output of an output signal to a third node for predetermined period of time;
    a first AND gate having an input arranged to receive a signal relating to a state of the first switch, an input coupled to the second node, and an output coupled to a fourth node;
    a second OR gate having a first input coupled to the third node, a second input coupled to the fourth node, and an output that is coupled to a fifth node, wherein the state of the second switch is controlled based on a value at the fifth node.

7. The apparatus of claim 6, wherein the second break before make circuit further comprises:
    a third OR gate having a first input coupled to a second thermal crowbar signal, a second input coupled to a second crowbar signal; and an output coupled to a sixth node;
    a delay circuit having an input coupled to the sixth node and an output arranged to delay output of a second output signal to a seventh node for predetermined period of time;
    a second AND gate having an input arranged to receive a signal relating to a state of the first switch, an input coupled to the sixth node, and an output coupled to an eighth node;
    a fourth OR gate having a first input coupled to the eighth node, a second input coupled to the seventh node, and an output that is coupled to a ninth node, wherein the state of the third switch is controlled based on a value at the ninth node.

8. The apparatus of claim 7, wherein the first OR gate further comprises, an input that is coupled to a thermal crowbar latch signal; and an input that is coupled to a crowbar latch signal; and wherein the second OR gate further comprises an input that is coupled to a second thermal crowbar latch signal; and an input that is coupled to a second crowbar latch signal.

9. The apparatus of claim 8, wherein the state of second switch is in a closed position when the value at the fifth node is a logical high; and wherein the state of third switch is in a closed position when the value at the ninth node is a logical high.

10. The apparatus of claim 9, further comprising:
    a fifth OR gate having an input that is coupled to the ninth node, an input that is coupled to the fifth node, and an output coupled to a tenth node, wherein the state of the second switch is controlled in response to a value at the tenth node; and
    a sixth OR gate having an input that is coupled to the ninth node, an input that is coupled to the fifth node, and an output coupled to an eleventh node, wherein the state of the second switch is controlled in response to a value at the tenth node.

11. An apparatus for providing a make signal, comprising:
    a first break before make circuit that is configured to receive a signal relating to a crowbar event and that is arranged to provide a first make signal when a fault condition exists; and a second break before make circuit that is configured to receive the signal relating to the crowbar event and that is arranged to provide a second make signal when the fault condition exists.

12. The apparatus of claim 11, wherein the first break before make circuit, further comprises:
   a first OR gate having a first input coupled to a thermal crowbar signal, a second input coupled to a crowbar signal; and an output coupled to a second node;
   a first delay circuit having an input coupled to the second node and an output arranged to delay output of an output signal to a third node for predetermined period of time;
   a first AND gate having an input arranged to receive a signal relating to a state of a first switch, an input coupled to the second node, and an output coupled to a fourth node; and
   a second OR gate having a first input coupled to the third node, a second input coupled to the fourth node, and an output that is coupled to a fifth node, wherein a value at the fifth node is used to control the coupling of a path to ground for a signal coupled to the first switch.

13. The apparatus of claim 12, wherein the first OR gate further comprises, an input that is coupled to a thermal crowbar latch signal; and an input that is coupled to a crowbar latch signal.

14. The apparatus of claim 13, wherein the second break before make circuit further comprises:
   a third OR gate having a first input coupled to a second thermal crowbar signal, a second input coupled to a second crowbar signal; and an output coupled to a sixth node;
   a delay circuit having an input coupled to the sixth node and an output arranged to delay output of a second output signal to a seventh node for predetermined period of time;
   a second AND gate having an input arranged to receive a signal relating to a state of the first switch, an input coupled to the sixth node, and an output coupled to an eighth node;
   a fourth OR gate having a first input coupled to the eighth node, a second input coupled to the seventh node, and an output that is coupled to a ninth node, wherein a value at the ninth node is used to control the coupling of a path to ground for a signal coupled to the first switch.

15. The apparatus of claim 14, wherein the third OR gate further comprises, an input that is coupled to a second thermal crowbar latch signal; and an input that is coupled to a second crowbar latch signal.

16. The apparatus of claim 15, further comprising:
   a fifth OR gate having an input that is coupled to the ninth node, an input that is coupled to the fifth node, and an output coupled to a tenth node, and
   a sixth OR gate having an input that is coupled to the ninth node, an input that is coupled to the fifth node, and an output coupled to an eleventh node.

17. A method for providing a path to ground for a charging signal when a fault condition occurs; comprising:
   monitoring for the fault condition using a first break before make circuit;
   monitoring for the fault condition using a second break before make circuit;
   determining when the fault condition occurs, and when the fault condition occurs, providing the path to ground for the charging signal after the charging signal is decoupled from a cell.

18. The method of claim 17, wherein monitoring for the fault condition, further comprises determining when a temperature relating to the cell exceeds a predetermined threshold.

19. The method of claim 18, wherein the predetermined temperature is 125 degrees Fahrenheit.

20. The method of claim 19, wherein monitoring for the fault condition, further comprises determining when the charging signal exceeds a predetermined threshold.

* * * * *